US009143564B2

(12) United States Patent
Milburn et al.

(10) Patent No.: US 9,143,564 B2
(45) Date of Patent: Sep. 22, 2015

(54) CONCERT SERVER INCORPORATING FRONT-END AND BACK-END FUNCTIONS TO COOPERATE WITH AN APP TO PROVIDE SYNCHRONIZED MESSAGING TO MULTIPLE CLIENTS

(71) Applicants: Andrew Milburn, Los Angeles, CA (US); Thomas Hajdu, Santa Barbara, CA (US)

(72) Inventors: Andrew Milburn, Los Angeles, CA (US); Thomas Hajdu, Santa Barbara, CA (US)

( * ) Notice: Subject to any disclaimer, the term of this patent is extended or adjusted under 35 U.S.C. 154(b) by 232 days.

(21) Appl. No.: 13/895,313

(22) Filed: May 15, 2013

(65) Prior Publication Data

US 2013/0325928 A1 Dec. 5, 2013

Related U.S. Application Data

(60) Provisional application No. 61/648,593, filed on May 18, 2012, provisional application No. 61/670,754, filed on Jul. 12, 2012, provisional application No. 61/705,051, filed on Sep. 24, 2012, provisional application No. 61/771,629, filed on Mar. 1, 2013, provisional application No. 61/771,646, filed on Mar. 1, 2013, provisional application No. 61/771,690, filed on Mar. 1, 2013, provisional application No. 61/771,704, filed on Mar. 1, 2013.

(51) Int. Cl.

| | |
|---|---|
| ***H04L 29/08*** | (2006.01) |
| ***H04N 5/04*** | (2006.01) |
| ***G11B 27/034*** | (2006.01) |
| ***G11B 27/10*** | (2006.01) |
| ***H04W 4/20*** | (2009.01) |
| ***G10L 21/10*** | (2013.01) |
| *H04L 29/06* | (2006.01) |
| *H04W 4/06* | (2009.01) |
| *H04W 4/02* | (2009.01) |
| *G10L 25/03* | (2013.01) |

(52) U.S. Cl.

CPC ............ *H04L 67/1095* (2013.01); *G10L 21/10* (2013.01); *G11B 27/034* (2013.01); *G11B 27/105* (2013.01); *H04L 65/403* (2013.01); *H04L 65/4076* (2013.01); *H04L 67/10* (2013.01); *H04N 5/04* (2013.01); *H04W 4/206* (2013.01); *G10L 25/03* (2013.01); *H04L 65/40* (2013.01); *H04W 4/02* (2013.01); *H04W 4/06* (2013.01)

(58) Field of Classification Search

None

See application file for complete search history.

(56) References Cited

U.S. PATENT DOCUMENTS 8,306,013 B2 * 11/2012 Chiang ......................... 370/350
8,392,530 B1 * 3/2013 Manapragada et al. ...... 709/219
8,503,984 B2 * 8/2013 Winbush, III .............. 455/414.1

(Continued)

*Primary Examiner* — Nicholas Taylor
*Assistant Examiner* — Clayton R Williams
(74) *Attorney, Agent, or Firm* — Continuum Law; Robert P. Cogan

(57) ABSTRACT

In a communications system, a controller communicates to multiple client devices, each subject to a different latency, in an application in which the multiple client devices need to react substantially simultaneously to a command from a server. A controller front-end in a server provides an abstract environment for the acceptance, initiation, and processing of messages. The framework provides a scaffold which handles reception of messages and makes them available to the specific application business logic as events to be processed. A back-end enables synchronized command execution, abstracted database table definition, creation of generalized table access, selective message transmission, and the like. By providing the back-end and front-end foundation framework, the present subject matter provides the foundational components in the system so that development of mobile applications is simplified.

9 Claims, 16 Drawing Sheets

(56) References Cited

U.S. PATENT DOCUMENTS 8,681,822 B2 * 3/2014 Bradley et al. ................ 370/503
8,918,541 B2 * 12/2014 Morrison et al. ............. 709/248
2008/0187282 A1 * 8/2008 Brady et al. .................... 386/66
2009/0215538 A1 * 8/2009 Jew ................................ 463/42

* cited by examiner

| FIELD NAME | VALUE | DIRE-CTION | COMMENT | |
|---|---|---|---|---|
| MSGID | 1000 | B | MESSAGE IS SENT TO BUSINESS LOGIC ONLY (NOT FORWARDED TO ANY CLIENTS). | 242 |
| MSGNAME | REGISTER | B | | 246 |
| NONCE | STRING | O/I | FOR OUTGOING MESSAGE, THIS IS THE NEW NONCE PROVIDED WITH THE LAST RESPONSE; FOR INCOMING MESSAGE IT IS THE NONCE TO USE WITH THE NEXT OUTGOING MESSAGE | 248 |
| SRCAPP | UMBILICAL | O/I | INFORMS THE BACK-END AND THE RECEIVING APPLICATION THAT THE MESSAGE CAME FROM THE UMBILICAL FRONT-END OR BACK-END. | 250 |

FIG. 12 (CONTINUED ON NEXT SHEET)

| NAME/VALUE PAIRS | TYPE | | | |
|---|---|---|---|---|
| USERID | STRING | O | FOR UMBILICAL WILL BE DEVICE NAME | 252 |
| PASSWORD | STRING | O | WILL BE BLANK FOR UMBILICAL; SERVER CAN IGNORE THE PRESENCE/ABSENCE OF THIS FIELD FOR UMBILICAL | 254 |
| DEVTOKEN | STRING | I | FOR UMBILICAL WILL BE IMEI NUMBER OF THE PHONE | 256 |
| DEVTYPE | NUMERIC | O | 101 == IPHONE; 201 == ANDROID; 301 == PALM; 401 == PC; 501 == MAC. DEVTYPE INDICATES FAMILY AND SPECIFIC MODEL/TYPE WITHIN THE FAMILY | 258 |
| RESULT | NUMERIC | I | 0 == SUCCESS<br>1 == FAILED TO REGISTER<br>2 == FAILED TO REGISTER; DEVICE UNSUPPORTED<br>100 == SUCCESS; ALREADY REGISTERED; EXISTING REGID IS PROVIDED | 260 |
| RESULTMSG | STRING | I | USER FRIENDLY MESSAGE TEXT | 262 |
| REGID | STRING | I | UNIQUE REGISTRATION ID FOR THIS DEVICE. SHOULD BE USED IN ALL SUBSEQUENT COMMUNICATIONS. FOR UMBILICAL WILL JUST BE THE DEVICE TOKEN. APPLICATION SHOULD SAVE THIS TO PERSISTENT STORAGE AND USE IT FOR ALL SUBSEQUENT MESSAGES ACROSS APPLICATION INVOCATIONS. | 264 |

FIG. 12 CONTINUED

CONCERT SERVER INCORPORATING FRONT-END AND BACK-END FUNCTIONS TO COOPERATE WITH AN APP TO PROVIDE SYNCHRONIZED MESSAGING TO MULTIPLE CLIENTS

CROSS REFERENCE TO RELATED APPLICATIONS

This patent application claims priority of Provisional Patent Application 61/648,593 filed May 18, 2012, Provisional Patent Application 61/670,754 filed Jul. 12, 2012, Provisional Patent Application 61/705,051filed Sep. 24, 2012, Provisional Patent Application 61/771,629 filed Mar. 1, 2013, Provisional Patent Application 61/771,646 filed Mar. 1, 2013, Provisional Patent Application 61/771,690 filed Mar. 1, 2013, and Provisional Patent Application 61/771,704 filed Mar. 1, 2013, the disclosures of which are each incorporated by reference herein in its entirety.

BACKGROUND OF THE INVENTION

1. Field of the Invention

The present subject matter relates to a method and system incorporating front-end and back-end functions which facilitate the interaction of third-party apps with a synchronized messaging system communicating with multiple clients for providing an enhanced concert experience.

2. Background

One form of a live event is a concert in a venue. The venue may accommodate on the order of thousands or tens of thousands of audience members. The prior art has taken initial steps in providing an enhanced concert experience. Initially, concerts were accompanied by light shows and the like. New, limited forms of interaction are provided which include communication from a central concert transmitter to portable user devices such as smartphones in an audience.

An important part of maintaining the continuing popularity and economic viability of an operating system or an operating environment is providing the ability for interaction with third-party applications, or apps. One such system communicates with multiple portable devices in a concert audience. Prior systems would not have been conducive to the use of apps providing a shared experience to audience members in a venue. Providing a shared experience requires that audience members receive communications in a synchronized manner. Had the prior art contemplated the provision of shared experiences, implementation would have been difficult since portable user devices are inherently subject to clock variations. Additionally, latency varies between devices on different cell phone carrier networks and even within the same cell phone carrier network. The internal time of day clock value can differ between adjacent devices by as much as several minutes. Additionally, the clock drift experienced by an individual device can be noticeable over timeframes as short as tens-of-minutes. This inherent difficulty does not affect the limited interactions previously provided. Typical mobile device transmissions have included email, Facebook data, or web-browsing. Such transmissions are not subject to ineffectiveness due to non-synchronization between various user devices.

Since an app writer working apart from the system could not account for time differences between devices, there can be no assurance that signals will be received at multiple user devices substantially concurrently to provide an experience that is in fact shared. Apps essentially could not be provided which could perform a function in which the portable interactive devices need to react "simultaneously," i.e., within a time window of preselected width.

In past systems, messages have not been constructed in a form within a framework to remove impediments to synchronization. For example, prior systems, to the extent that they have provided synchronization, have had features which do not lend themselves to allowing a new portable interactive device to join a network by performing a minimal number of operations.

Interaction of a sort has been provided between a concert server and portable interactive devices held by audience members. U.S. Pat. No. 8,090,878 discloses a more complicated method and system for synchronizing many clients to one central server. In this arrangement, the central server must download client software to each electronic device to be synchronized. The client software allows the electronic device to perform data synchronization with the server. After the synchronization is complete, the client software may be removed from the electronic device. Downloading the client software to each client device is a cumbersome process. After the client software is removed from each electronic device, synchronization is no longer provided.

United States Published Patent Application Number 20100074278 discloses a network element which synchronizes a number of clocks within a system and supports multiple independent timing domains. The network element must act as a master clock to which other clocks are slaved. The network cannot account for initial time differences among the clocks.

These systems do not provide for interaction beyond sending or receiving information.

United States Published Patent Application Number 20100129065 discloses a content request, storage, and configuration system provided for attendees of live events or performances which associates pieces of content with one or more keywords, and configures the content for the benefit of a user. Content owners load content into the system or link content elsewhere to the system, and optionally designate a set of actions to be taken. This system is directed toward the gathering of information by the content owner rather than to providing shared content to users.

SUMMARY

Briefly stated, in accordance with the present subject matter, a method and system incorporating front-end and back-end functions facilitate the interaction of third-party apps with a synchronized messaging system communicating with multiple clients for providing an enhanced concert experience. The apps are simplified in comparison to apps which would be required in the absence of the present subject matter.

The present subject matter operates so that the devices will respond substantially simultaneously to a command from a server to implement functions of the app without the app having to account for differing sources of latency. The operation may be repeated continually in order to provide dynamic response to changing conditions and to accommodate new devices coming online in the network.

A controller front-end foundation in the server provides an abstract environment for the acceptance, initiation, and processing of messages. The framework provides a scaffold which handles reception of messages and makes them available to the specific application business logic as events to be processed. A back-end enables synchronized command execution, abstracted database table definition, creation of generalized table access, selective message transmission, and the like.

By providing both the back-end and front-end foundation framework, the present subject matter provides the foundational components in the system so that development of mobile applications is simplified.

BRIEF DESCRIPTION OF THE DRAWINGS

FIG. 10, consisting of FIGS. 10A, 10B, and 10C, is a flowchart of the operation of a controller to interact with the client devices, wherein

FIG. 12 is a block diagram of the structure of a packet including information which is sent to a client device to initiate execution of a command at the firing time;

DETAILED DESCRIPTION

One application of the present subject matter is to produce simultaneous outputs from a plurality of client devices. One example of a plurality of client devices is a group of portable interactive devices, e.g., cell phones, each having a display. A composite display distributed over the plurality of devices may be designed so that an optical effect in a venue is achieved. For example, a central system could command that every device display a band logo. Alternatively, different displays could be commanded at the same time for subgroups of devices. The present subject matter provides for synchronization of responses of the portable interactive devices so that the desired effect is achieved.

Figure 1A:
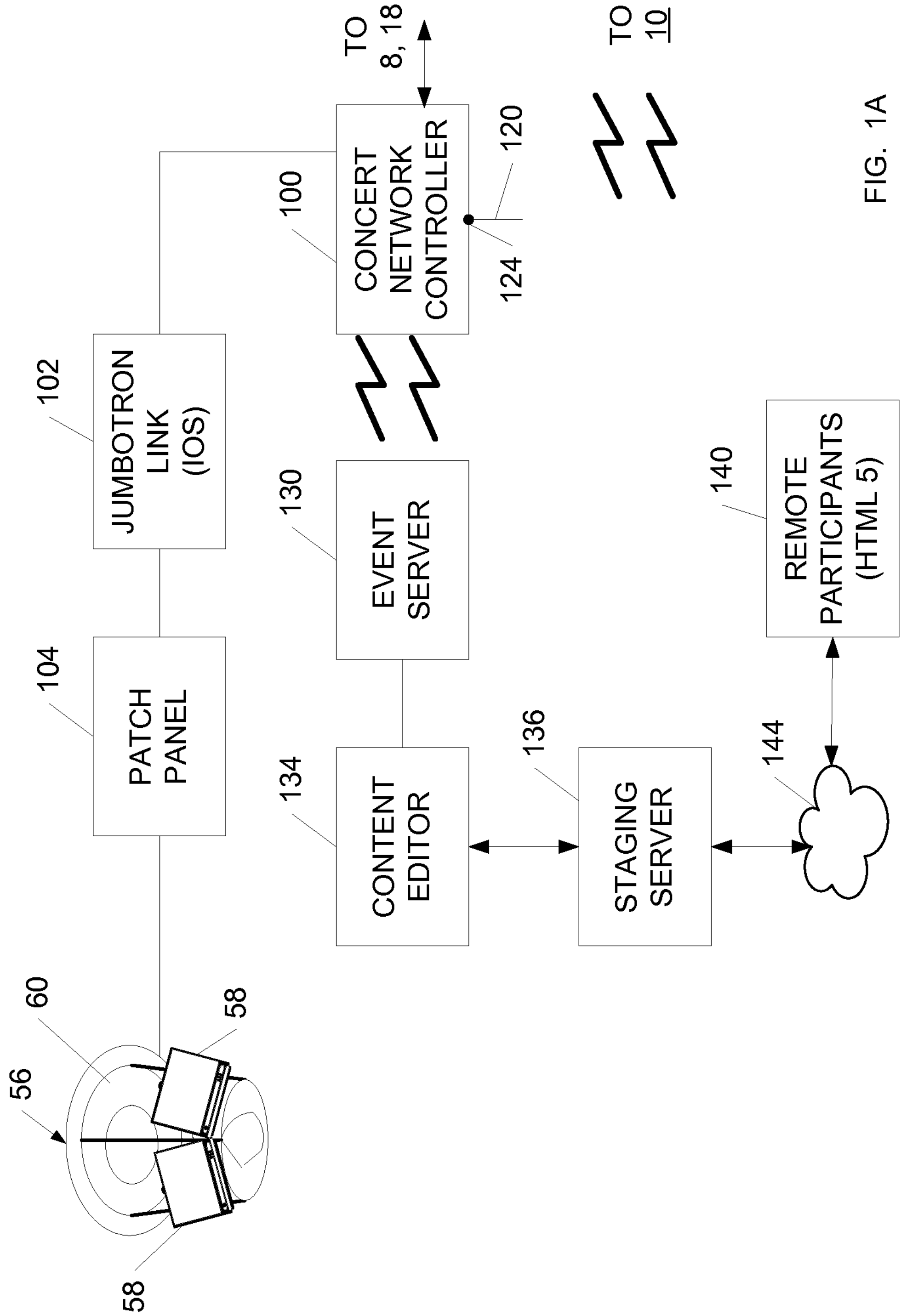
FIG. 1, consisting of FIGS. 1A and 1B, is an illustration of a method and an apparatus utilizing the present subject matter operating in a venue.
Figure 1B:
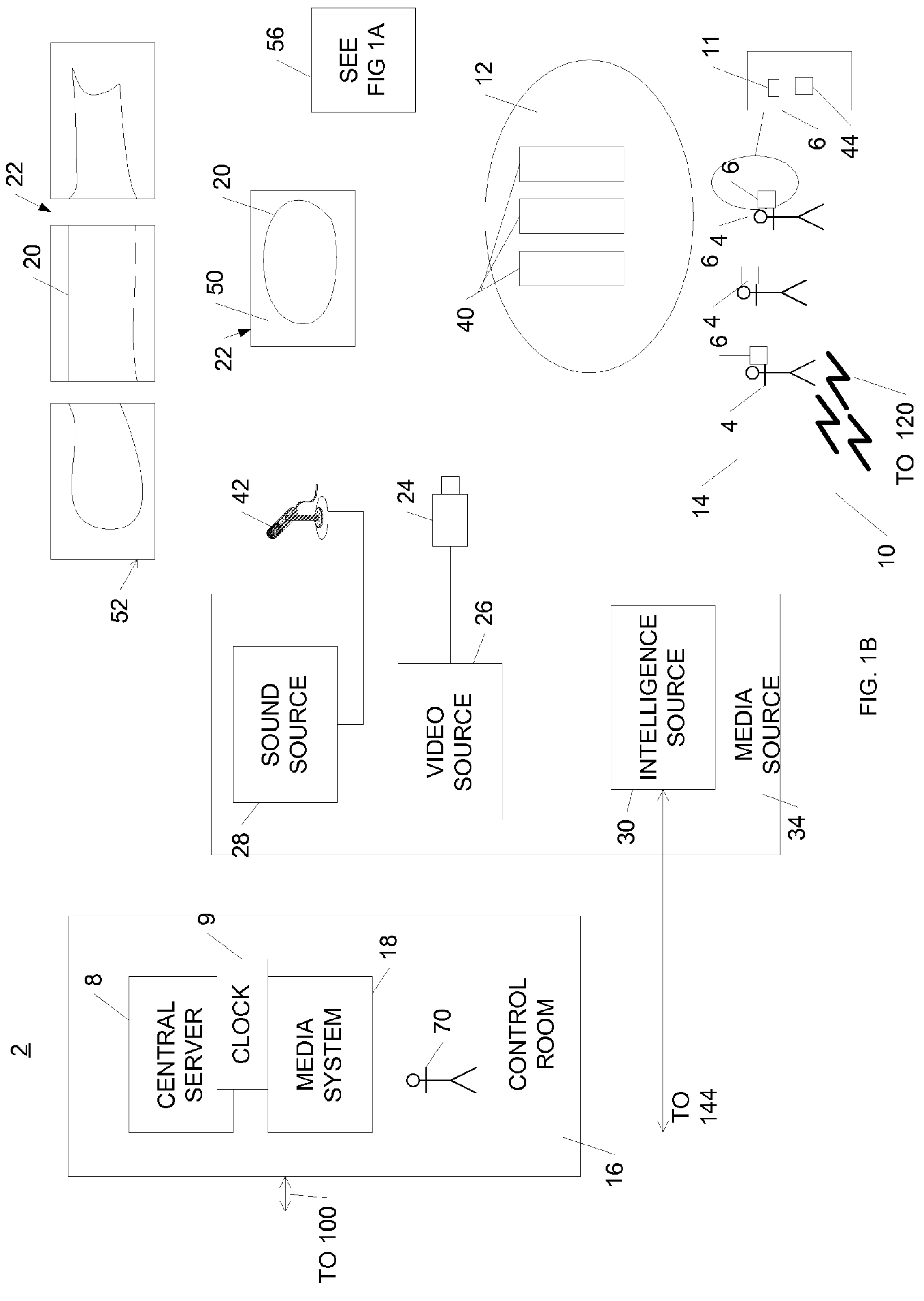
Figure 2:
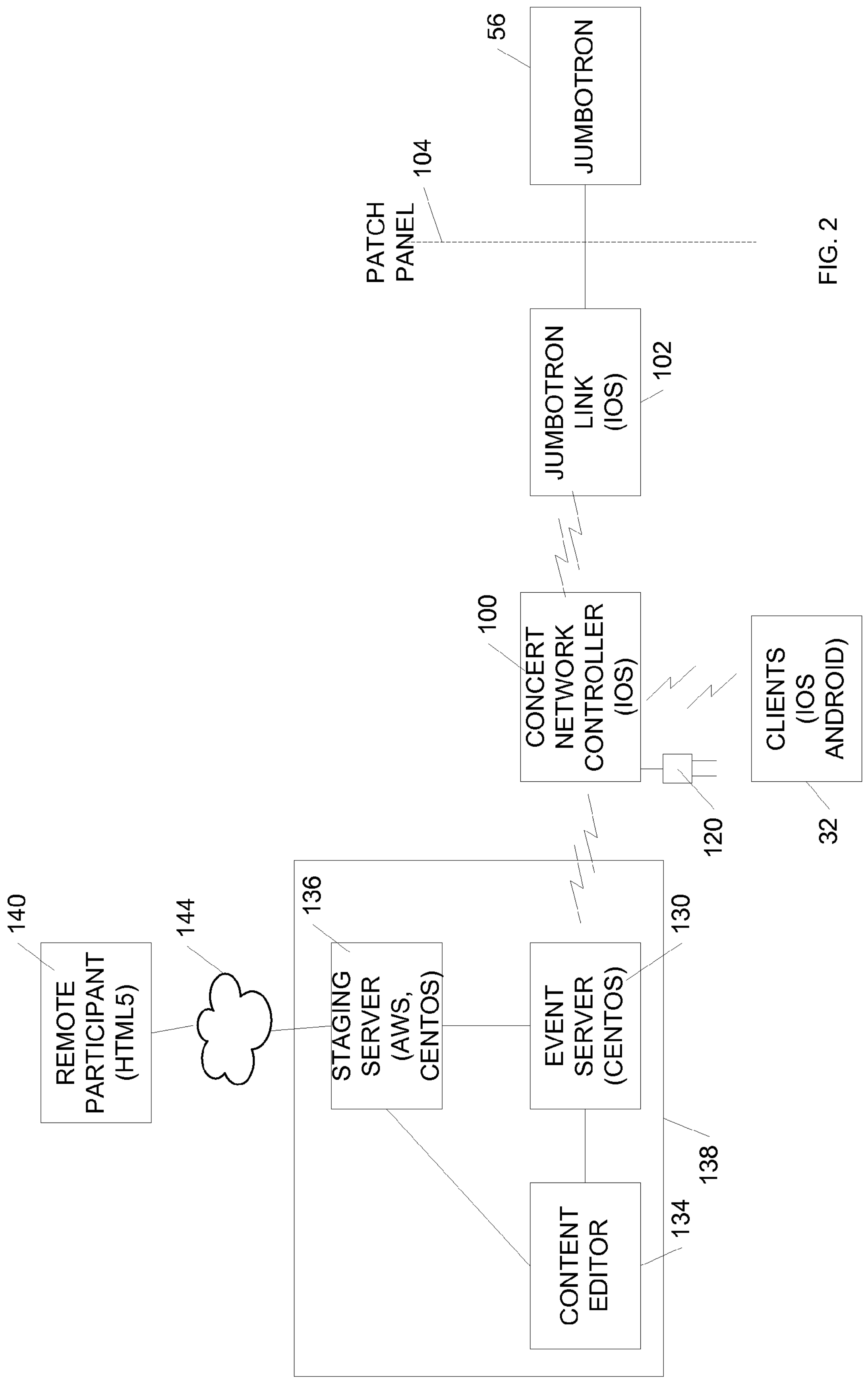
FIG. 2 is a block diagram of the system illustrated in FIG. 1.

FIG. 1, consisting of FIGS. 1A and 1B, is an illustration of a venue 10 comprising a system 2 in accordance with the present subject matter. FIG. 2 is a high-level block diagram of communication paths in the system illustrated in FIG. 1. FIGS. 1 and 2 are discussed at the same time. The system 2 may be used in conjunction with a live event, for example a concert. Two-way interactivity is provided between a central server 8 and individual audience members 4 who may each have a portable interactive device 6. The central server 8 includes a central clock 9. The portable interactive device 6 may be a smartphone, tablet, or other device. The present subject matter addresses providing reliable, high-capacity, synchronized interaction in a highly efficient manner. A basic application, or “app,” 11 is installed in each portable interactive device 6. The basic app 11 allows the operating system of each interactive device 6 to cooperate with the signals and commands further discussed below.

In addition, a developer app 44 may be installed on each interactive device 6 to provide additional forms of interaction between audience members 4 and the central server 8. The developer app 44 may come from virtually any source. However, it is the usual practice in this market that the developer app 44 will be a third-party app. The term third-party is used to describe the operational context of the developer app 44 as opposed to describing the writer of the application. As discussed in further detail with respect to FIGS. 9-12 below, the present subject matter provides a framework for conducting front-end and back-end operations in the system software so that developer apps 44 may be readily interfaced with the present system. The developer apps 44 need not be capable of handling problems such as variable latencies as further discussed below. The present subject matter facilitates the use of simplified apps, thus making the current system more attractive to app writers. This in turn leads to greater usefulness of the system, length of the product life cycle, and enhanced financial return to system operators.

The venue 10 may include a stage 12, audience area 14, a control room 16, and a media system 18 which may be located in the control room 16. The media system 18 receives audio, video, and intelligence from sources and may be operated to perform control room functions such as mixing, selecting, and processing. A video program 20 is shown on a display 22.

The media system 18 is used to couple outputs from a video source 26, a sound source 28, and other intelligence source 30. The video source 26 may comprise one or more television cameras 24. In the present illustration, a media source 34 includes the video source 26, sound source 28, and other intelligence source 30. The sound source 28 comprises audio output from a live performance provided by a performer or performers 40 coupled by transducers 42, such as microphones. Alternatively, one or more of the video source 26, the sound source 28, and other intelligence source 30 may comprise sources of streaming content, prerecorded content, stored data, or currently processed content from any source. These sources may be local, remote, or both.

In one preferred form the display 22 is a screen 50 that comprises a backdrop for the stage 12. The display 22 could comprise an array 52 of screens over which the video program 20 is distributed. In another form, often used in arenas, the display 22 could comprise a display unit 56 which includes a plurality of monitors 58 on one support 60, with each monitor 58 facing in a different direction. Examples of the display unit 56 are available under the trademark Jumbotron®.

The media system 18 is operated by a VJ 70. The VJ 70 may comprise one or more personnel or a programmed computer. It is not essential that the control room 18 be located at the venue 10. The media system 18 provides content to a concert network controller 100. The concert network controller 100 may both receive and transmit information. The concert network controller 100 provides an input to a display link 102, which is coupled by a patch panel 104 to the display unit 56.

The concert network controller 100 may also comprise a Wi-Fi hotspot 120 providing and receiving signals to and from an audience area 14. As further described below, content may be provided both to and from audience members 4. The concert network controller 100 may also interact with remote participants 140.

Figure 3:
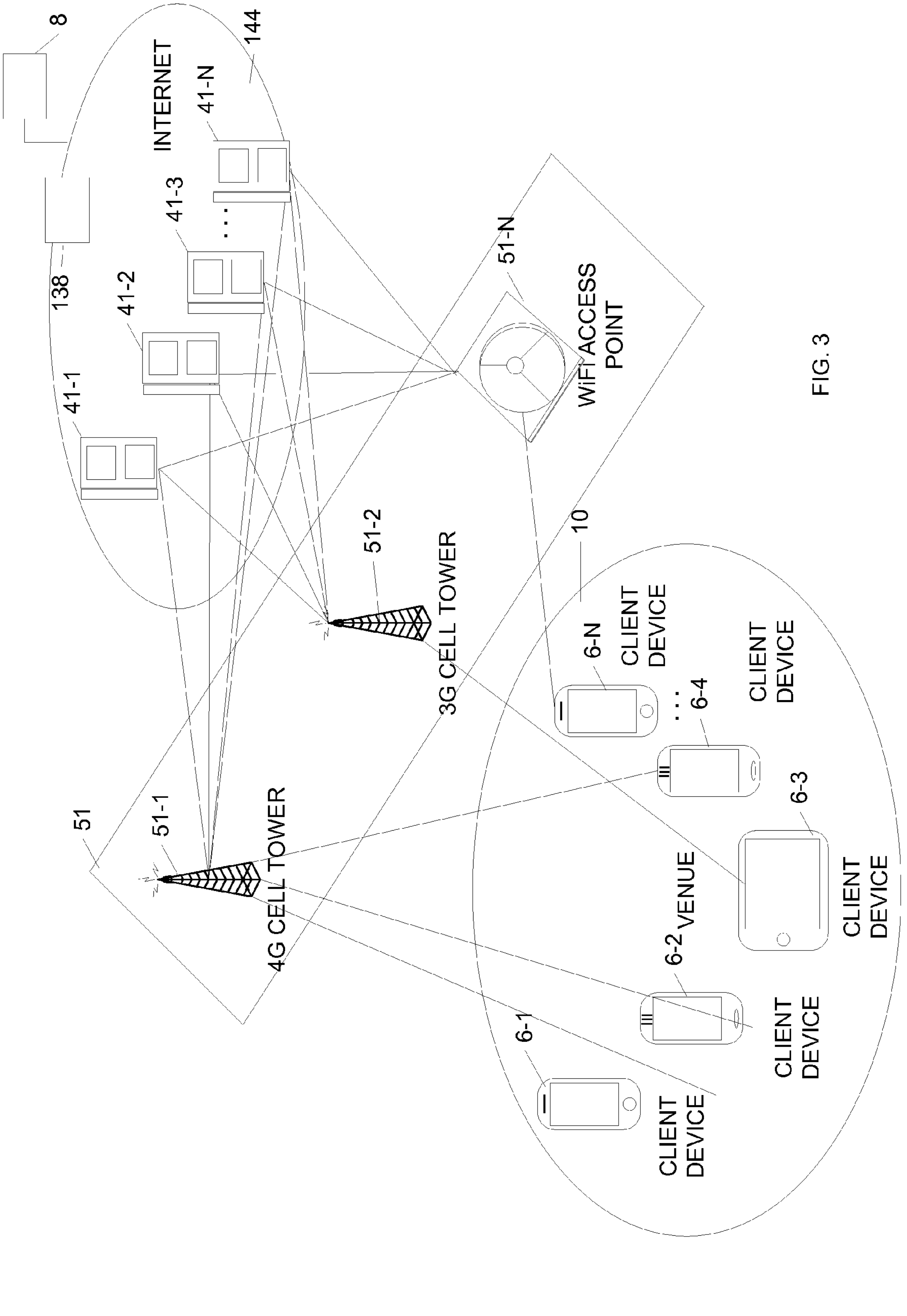
FIG. 3 is block diagram of a nominal set of communication paths between signal sources and client devices.

The concert network controller 100 is preferably wirelessly connected to an event server 130, which can provide communications between remote participants 140 and the concert network controller 100. The event server 130 is coupled to a content editor 134, which interacts with a staging server 136. The staging server 136 may be coupled to the remote participants 140 by a network, for example, the Internet 144. The Internet 144 may utilize Network Time Protocol (NTP) servers 41 (FIG. 3). The event server 130, the content editor 134, and the staging server 136 are collectively referred to as a communications server 138.

Communications will be provided between a target system and a source system. In the present description, "source system" is a device that wishes to send a message to a "target system." The target system is a device that is configured to receive sent messages in its operating-system via a network connection sub-system. Systems may include portable interactive devices 4 or the central server 8. The business logic running on the device can operate as the target or the source system at any moment. Operating as a source system or target system for a particular messaging transaction does not preclude operating as the other system for a different messaging transaction simultaneously.

In a nominal application, thousands of portable user devices 6 may communicate with the concert network controller 100. The communication will provide interaction for intended uses of the system 2. This alone could strain resources and require expensive T1 access lines of a quality exceeding that of the commercial grade DSL capacity normally utilized within a concert venue. Providing such capacity would be both expensive and impractical. Additionally, users 4 have the option to operate their portable user devices 6 in order to access the Internet and to access cell phone services. It is important to limit bandwidth usage requirements per portable user device 6 so that a large number of portable user devices 6 can be accommodated in one venue 10. This can be accomplished by disabling access to applications that are not part of the entertainment functions of the system 2. For purposes of the present description, the applications, contributing to functioning of the system 2 are referred to as business logic.

FIG. 3 is a block diagram of one embodiment of a communications system providing interaction with both local and remote users. The communications server 138 is coupled for networking the central server 8 to the Internet 144 via one or more preselected communications networks 51. NTP host servers 41 provide time synchronization for the communications networks 51. The communications networks 51 are the networks which forward signals to individual devices. The communications networks 51 may include networks 51-1 to 51-n, where n is an integer. In the present illustration, the network 51-1 is a 4G cell tower. The network 51-2 is a 3G cell tower. The network 51-n is a Wi-Fi access point. These forms of networks are merely exemplary. Each portable interactive device 6 receives a signal from a network 51.

Latencies can range from a time period approximating zero up to several seconds, or minutes, or more. In the present system, a firing time is selected so that portable interactive devices 6 will react to the signal from the communications networks 51 at the same time. The reactions occur "simultaneously." More specifically, the reactions occur within a time window of preselected width. A nominal value for the width of a window could be 0.1 second. Implementation of a selectable firing time is further discussed below.

The platform supports transmission of command execution messages to both remote participants 140 and the at-venue participants 4. The at-venue participants 4 utilize mono-cast Internet Protocol (IP) and multi-cast User Datagram Protocol (UDP) to transmit messages over the captive Wi-Fi network 120 which requires the deployment of a stand-alone Wi-Fi network suitably architected for the venue. Handling the potentially hundreds-of-thousands of remote users is generally not possible since it is common for venues to provide consumer-grade DSL Internet connections. The large load that such a large number of users would place on the main venue server, namely the event server 130, would also be untenable. Instead, all messages destined for external participants 140 are handled by a separate staging server 136 that need not be installed in or resident at the venue 10 itself. The staging server 136 may instead be resident at an external service provider which can dynamically scale to match the required external participant user load. The external service can comprise "cloud" service from providers such as Rackspace® or Amazon® AWS.

When sending messages to internal users, the event server 130 will send one additional message to the staging server 136 specially structured so the staging server 136 will subsequently send that message to all registered external participants. In this way single messages from the event server 130 can be broadcast to an arbitrary number of external users 140 without placing any additional burden on the at-venue infrastructure.

Figure 4:
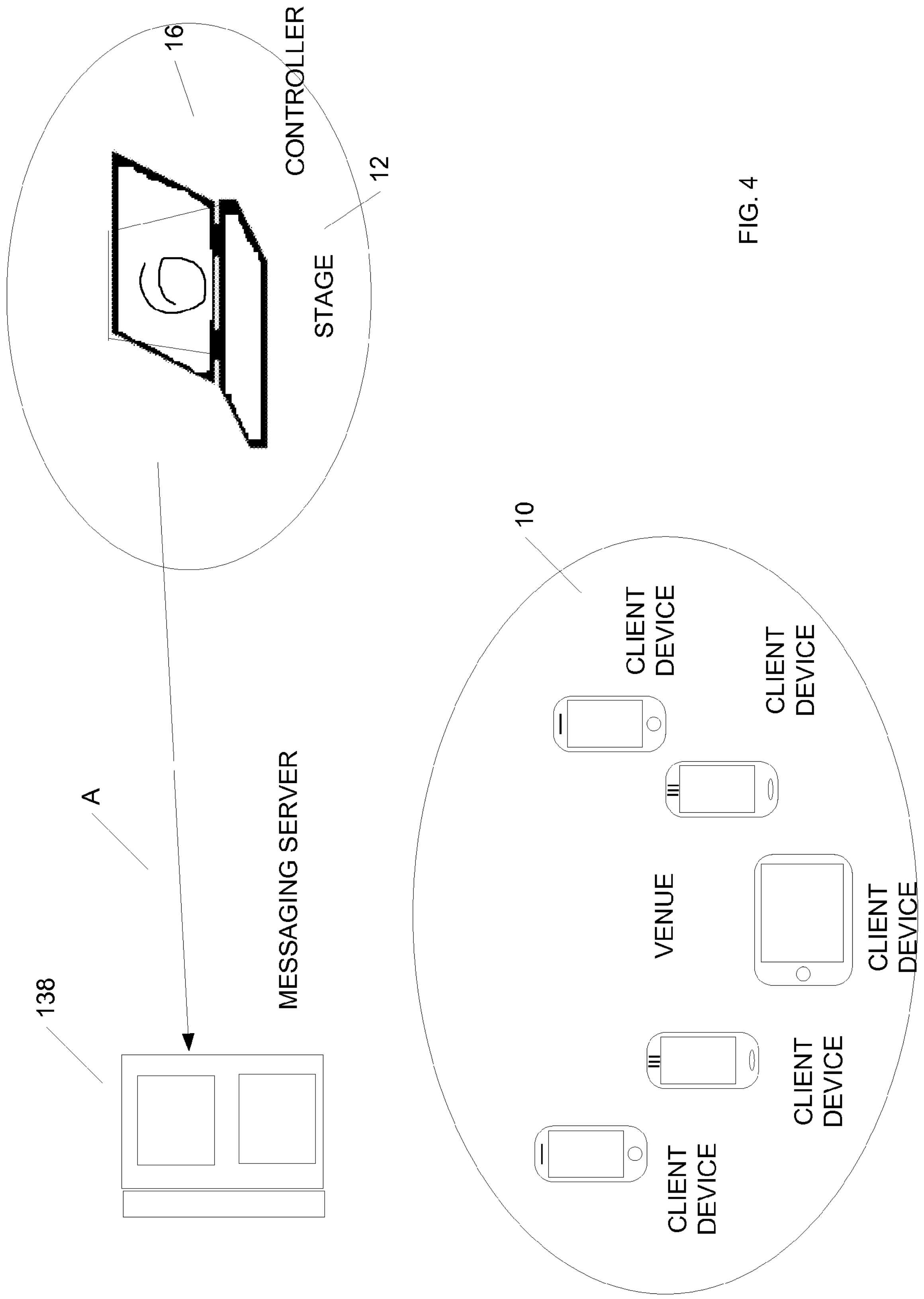
FIGS. 4 through 8 are illustrations of a sequence of operations in one embodiment of the present subject matter.

FIGS. 4 through 8 disclose sequential steps in the provision of signals bearing intelligence to be displayed by the portable interactive devices 6. In FIG. 4, the control room 16 sends a command A to the concert controller 100 and the communications server 138. This command may include accessed information from a preselected location within a memory in the control room 16. The command A is included in a package to invoke display of information, e.g., a band logo and a firing time. Firing time is a time at which the portable interactive devices 6 will operate simultaneously. In the present context, "simultaneously" means that the portable interactive devices 6 will all operate within a predetermined time window.

Figure 5:
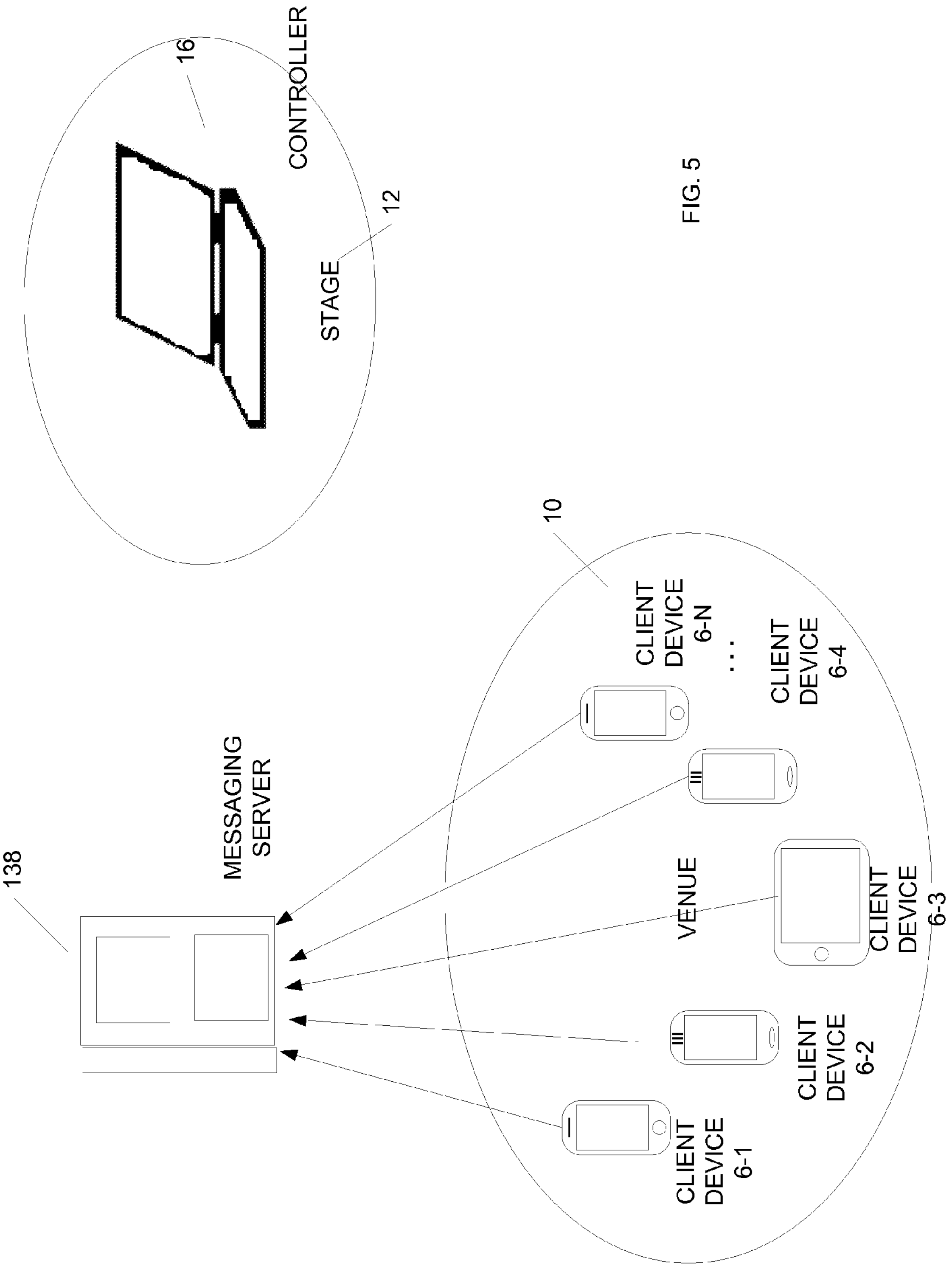
Figure 6:
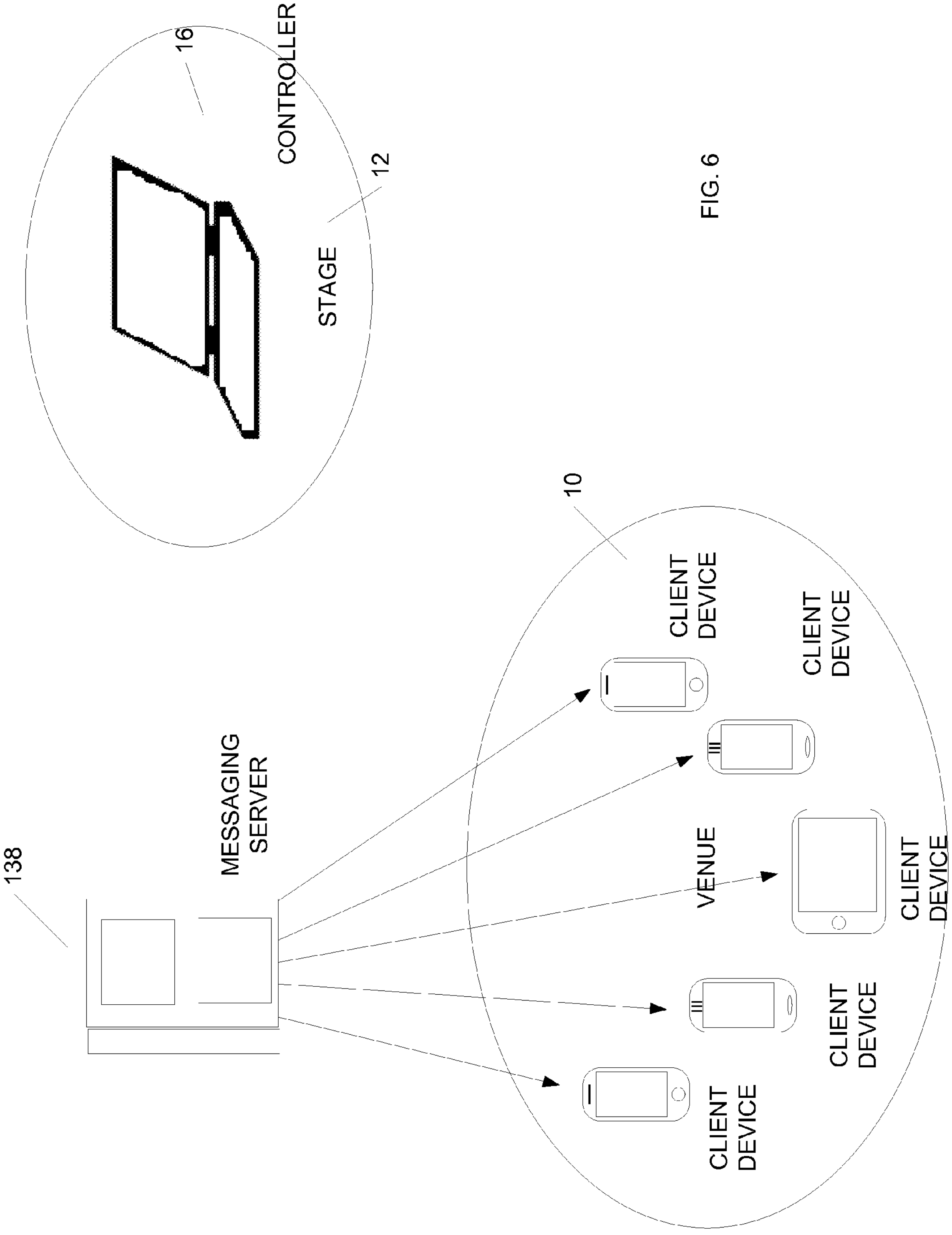
Figure 7:
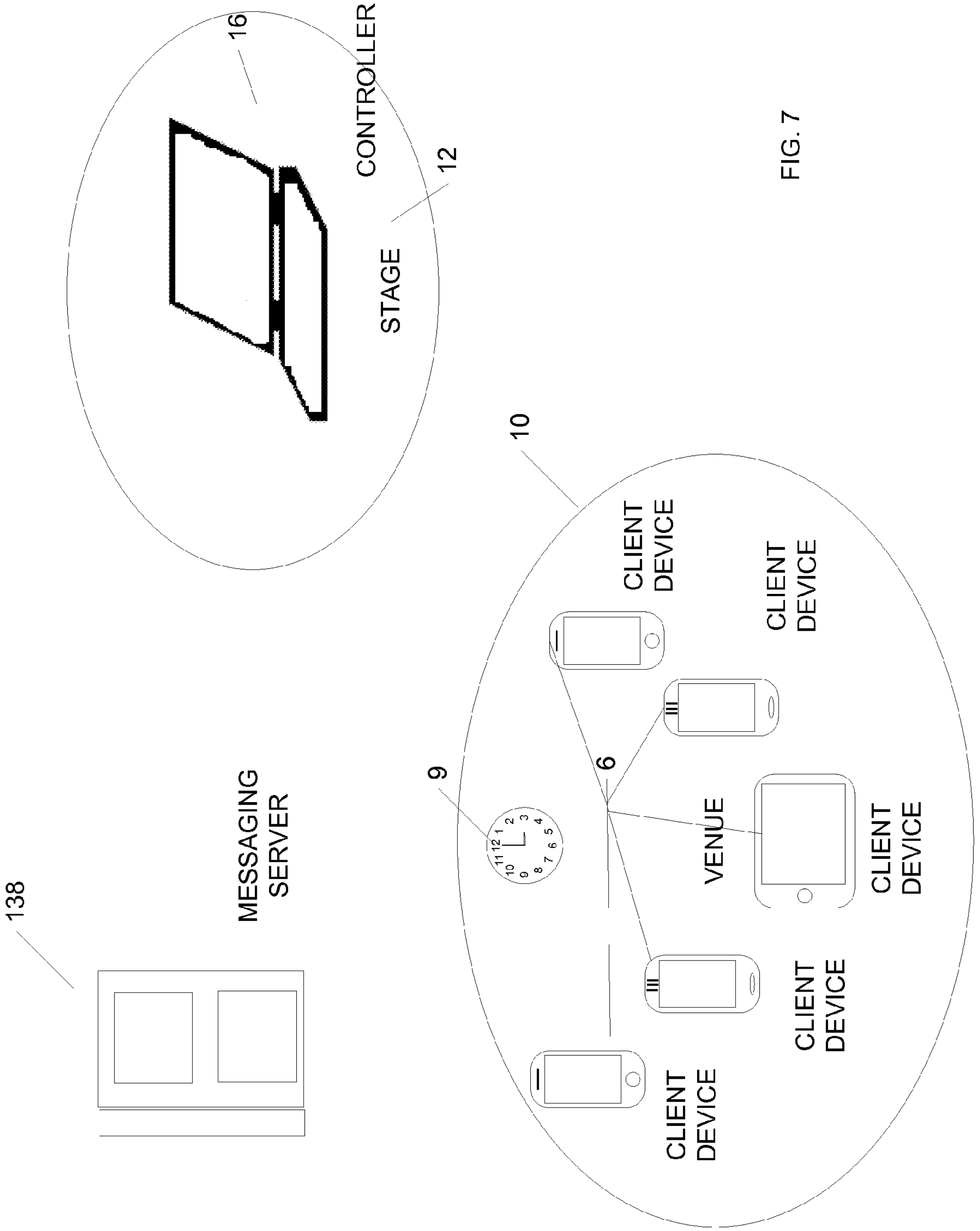
Figure 8:
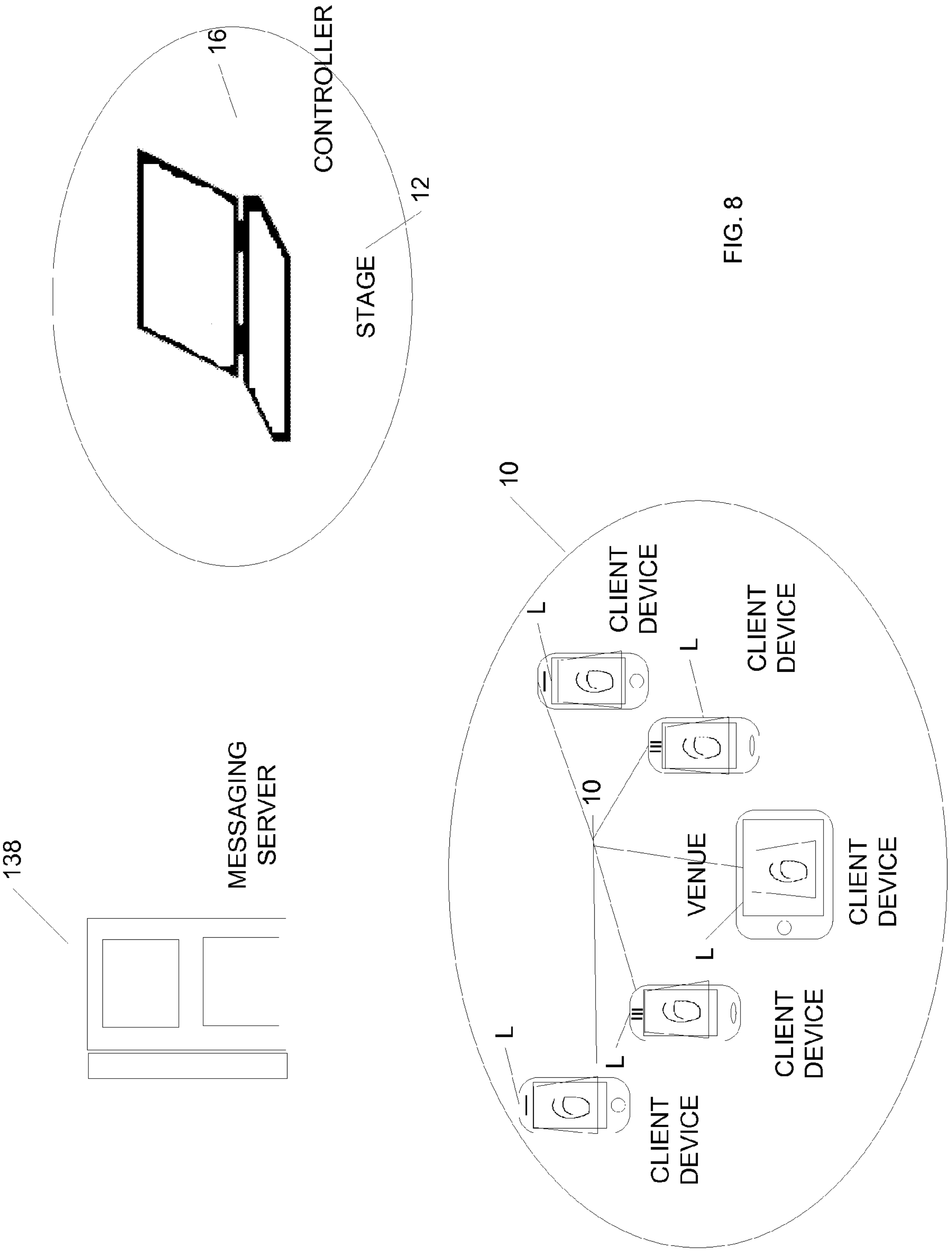

As seen in FIG. 5, the portable interactive devices 6 query the communications server 138 for any new commands which have been issued during a current operating cycle. FIG. 6 illustrates sending a command to show the preselected display at the firing time. As seen in FIG. 7, each portable interactive device 6 tracks time via a central clock 9. Each portable interactive device 6 monitors the central clock 9 so that it will fire at the end of a preselected time span after it receives the command A (FIG. 3). Preferably, there is a central clock 9 within each portable interactive device 6. As seen in FIG. 8, each portable interactive device 6 executes the command to display the band logo.

Figure 9:
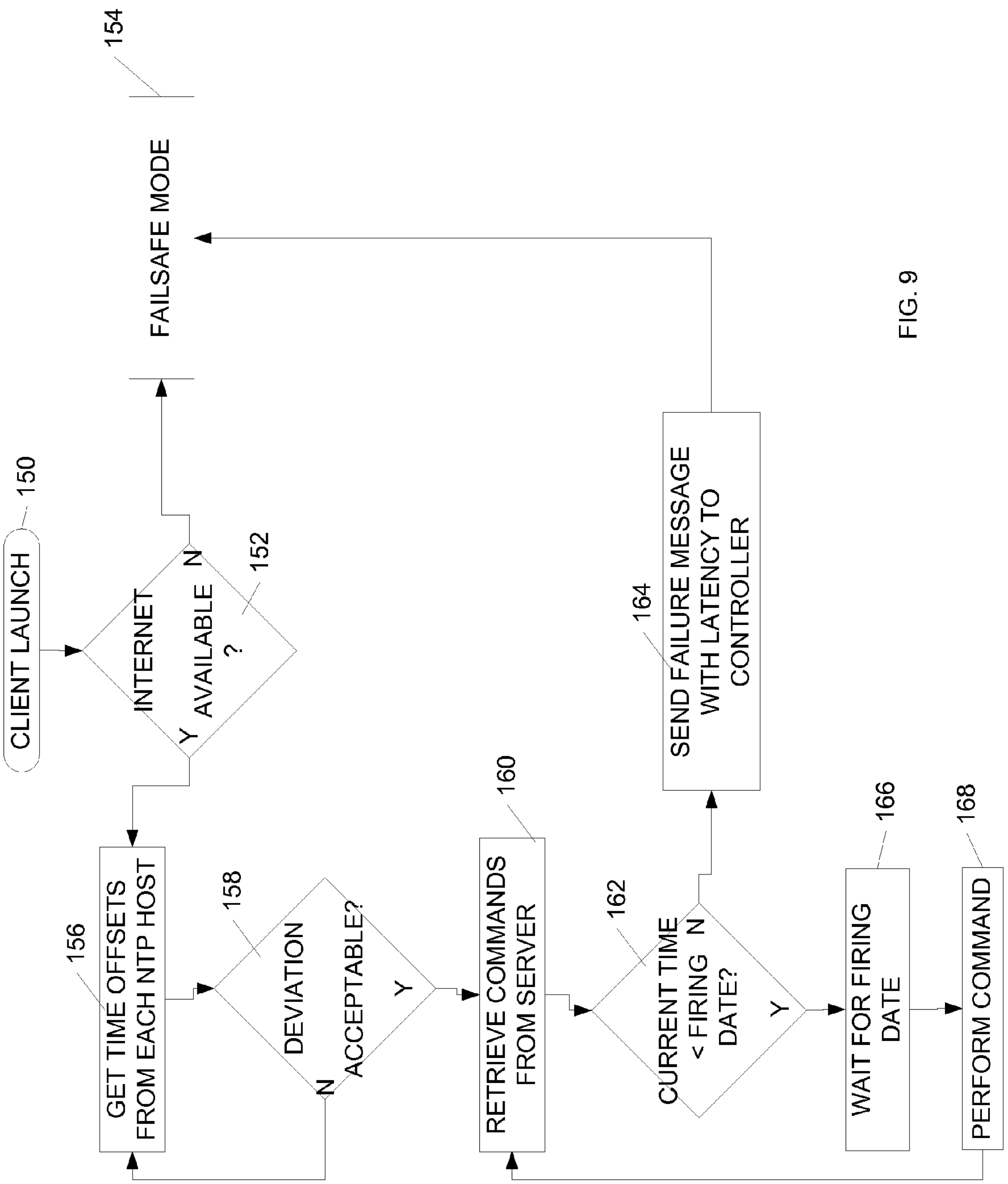
FIG. 9 is a flowchart of the operation of a client device to synchronize operations with other client devices.

FIG. 9 is a flowchart illustrating the manner in which portable interactive devices 6 access and utilize information. This routine is part of the front-end framework that cooperates with the basic app 11 and any developer app 44. The portable interactive devices 6 are client devices; they may be each referred to as the client. Different portable interactive devices 6 will follow the same procedure. An operating cycle begins at block 150. At block 152, the portable interactive device 6 senses whether the Internet is available. If not, operation proceeds to box 154, where a failsafe mode is invoked. In a failsafe mode, the portable interactive device 6 selects its own firing time. The firing time may be the same as that in a previous operating cycle. Alternatively, algorithms may be provided to select a computed firing time that may be a function of firing times of previous operating cycles or a function of previously received offset information from the NTP host servers 41. The failsafe mode provides an approximation of the firing time which would be provided when the various stages are interconnected by the Internet 40.

At block 156, each portable interactive device 6 receives and recognizes time offsets from each NTP host server 41. This is important since latency will vary from one communications path to another. On the Internet, time transfer delays are a function of variable parameters such as the level of server traffic and network bottlenecks. NTP is designed to compensate for some, but not all, network time delays between the host servers 41 and each client portable interactive device 6. Across local area network, NTP can give accuracy as good as a few milliseconds. Latency may be measured in a number of different ways. A given portable interactive device 6 may send a time-tagged signal to each NTP host server 41. To compute latency, the portable interactive device 6 may compare its own clock time to Internet time when a response is received. Other techniques are available.

At block 158, the acceptability of the deviation is measured. For example, the acceptable deviation could be defined by an offset time included in the signal sent to the portable interactive devices 6 in FIGS. 4 and 6. Alternatively, a maximum acceptable latency could be predefined and included in the basic application 11 installed on the portable interactive device 6. If the deviation is not acceptable, operation returns to block 156 where offset time is again measured. If the deviation is acceptable, operation proceeds to block 160 at which commands are obtained from the central server 8. This corresponds to the steps illustrated in FIGS. 5 and 6 above.

At block 162, the portable interactive device 6 compares current time with the firing time. If the current time is later than the firing time, a failure is detected. Operation proceeds to block 164 where a failure message with latency is sent to the central server 8 and the device is entered into the failsafe mode at block 154. At block 166, the device monitors current time to determine if the firing time has been reached. When the current time equals the firing time, at block 168, the command is performed. Operation returns to block 160 where the portable interactive device 6 will look for the next command at the communications server 138 in a next operating cycle.

Figures 10A, 10B, 10C:
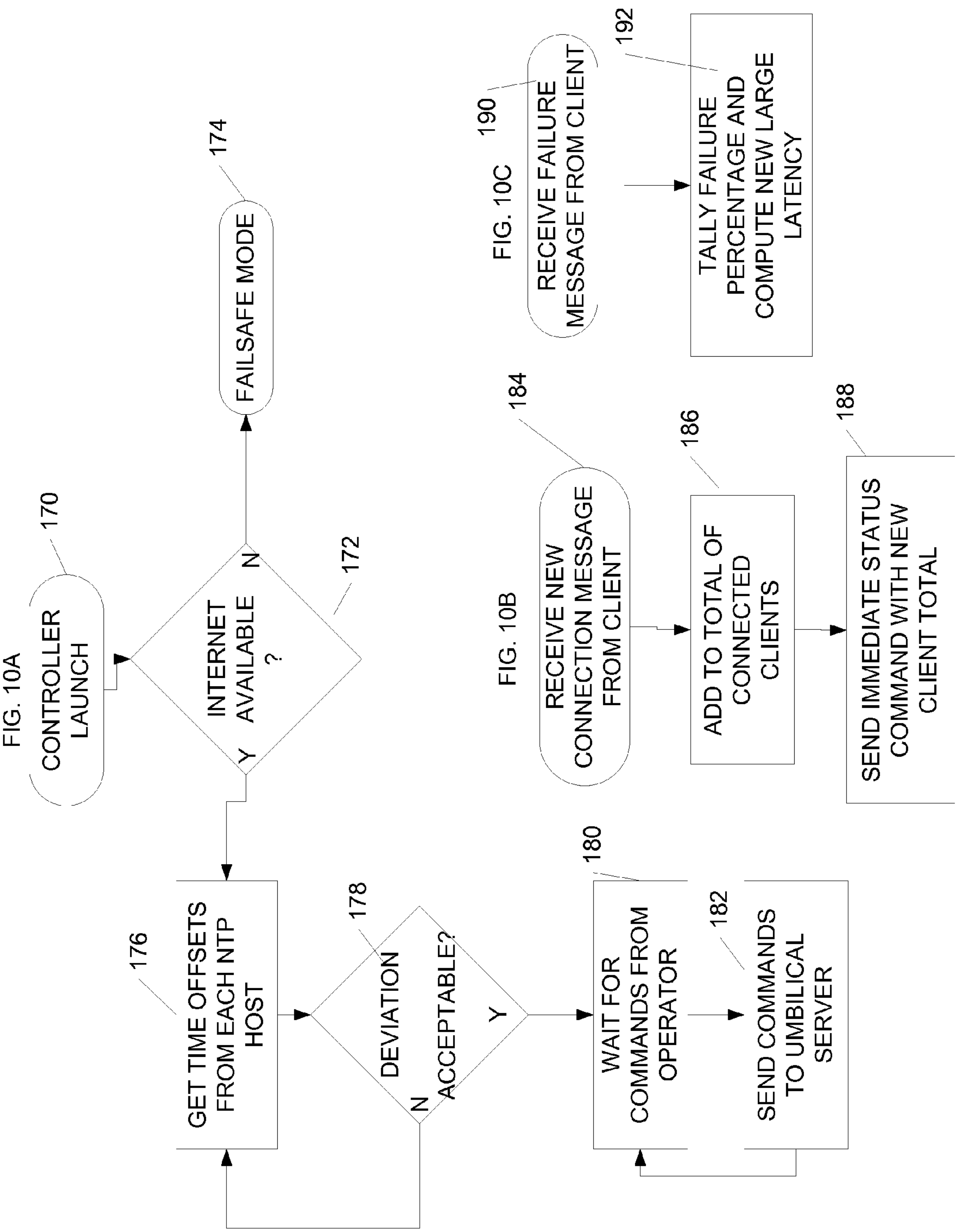
FIG. 10A illustrates a method to provide commands from the central server.
FIG. 10B illustrates monitoring by the central server of the current number of clients connected to the system.
FIG. 10C illustrates adjustment of a delay to define a maximum latency that will be accommodated.

FIG. 10, consisting of FIGS. 10A, 10B, and 10C is a flowchart illustrating operation at the central server 8. Functions which can be invoked synchronously include flash, vibrate, camera recording, video playback, audio playback, audio recording, visual display of audio analysis, visual display of text messages, and visual display of audience demographics on the individual portable interactive devices 6 or on the large screen 50. The developer app 44 can enable the performance of other functions, such as transmitting accelerometer data in an audience wide game.

FIG. 10A illustrates a method to provide commands from the central server 8. FIG. 10B illustrates monitoring by the central server 8 of the current number of clients connected to the system. FIG. 10C illustrates adjustment of the delay to define a maximum latency that will be accommodated.

As seen in FIG. 10A, operation is launched at block 170. At block 172, Internet status is checked. If there is no connection, operation proceeds to block 174. The controller enters the above-described failsafe mode. When the Internet connection is available, operation proceeds to block 176 where the central server 8 receives time offset signals from each NTP host server 41. Acceptability of the deviation is compared at block 178 to a preselected acceptable level. If the deviation is not acceptable, operation returns to block 176 to see if operation may proceed with an acceptable latency.

If the deviation is acceptable, operation proceeds to block 180. At that point, the central server 8 waits for commands from the control room 16. After a command is received, the command is sent to the communications server 138 at block 182. Operation then returns to block 180 where the central server 8 waits for a command during a next operating cycle.

FIG. 10B illustrates monitoring by the central server 8 of the total number of currently connected clients. At block 184, a new message is received in response to connection from a new client, and other portable interactive devices 6. One preferable way to produce this signal which is received is to have the portable interactive device 6 generate a new connection message in response to activation of the video communication application. The new client connection message indicates that the total number of connected client portable interactive devices 6, has increased. This may be indicated by incrementing a client account register by 1. The client account register provides an input within the central server 8, and the central server 8 implements a video function to be provided utilizing the updated number of portable interactive devices 6.

FIG. 10C illustrates adjustment of the delay to define a maximum latency that will be accommodated. At block 190, the central server 8 receives a message when latency of a command signal reaching a client portable interactive device 6 exceeds the preselected permissible latency. This signal is produced as illustrated in FIG. 9 at blocks 162 and 164. At block 192, the central server 8 receives signals to update a storied, calculated percentage of these failures as defined in FIG. 9. Further processors compute a new, larger latency in order to allow the latencies of all the devices with a preselected range to be included in the process of responding to a command. The preselected range may be a function of a number of standard deviations among the measured latencies.

The above method and system provide a framework including both the back-end and front-end foundational components. Mobile application developers are free to devote their creativity to new applications, and they do not have to create applications that require information about a context to which the developers do not have access. This context is the system in which portable users devices 6 have latencies that may differ from latency of other user devices and in which the latency of an individual portable user device may change with time. The information is the timing information necessary to cause the portable user devices to respond to a command within one clock cycle.

The front-end framework is provided by the coupling of the user devices 6 to the concert controller 100. Processing in order to compensate for the varying latencies of user devices 6 is performed inside the concert controller 100 or central server 8. In this manner, the developer app 44 will not need to deal with the problem of latency. The back-end framework couples signals from other sources to the interactive user devices 6. Sources accessed by the back-end framework include stored content as may be selected by a VJ 80 or content assembled by the concert controller 100 uploaded from portable user devices 6. The back-end program steps may interact directly with the front-end or, perhaps more typically, may comprise a program called from an intermediate program that mediates front-end and back-end activities.

The system has a back-end that enables application development teams to utilize functions of business logic deployment, the aforementioned synchronized command execution, abstracted database table definition and creation, generalized table access supporting all Create, Retrieve, Update, Delete (CRUD) operations, selective message transmission based on role, physical location, age, device type/capability, custom, registration, historical demographic retrieval, or other parameters. The deployment infrastructure allows dynamic deployment of new functions without requiring a server restart. Synchronized command execution automatically places a future command execution timestamp on each outgoing message to be handled by the client-side library.

In addition, both mono-cast and multi-cast message groupings can be created depending on the specific needs of the application. A final hurdle for any application is the client-side software to handle the client-side business logic and render the results. The front-end foundation provides an abstract environment for the acceptance, initiation and processing of messages. The framework provides a scaffold which handles reception of messages and makes them available to the specific application business logic as events to be processed. The application developer is free to concentrate on the business of implementing the functionality rather than decoding incoming messages, worrying about time synchrony or preparing to send a new message.

For example, the (TAPI) is sometimes referred to as a front-end interface for telephone services. A program's TAPI requests are mapped by Microsoft's TAPI Dynamic Link Library programs (an intermediate set of programs) to a "back-end" program or driver that makes the more detailed series of requests to the telephone hardware in the computer.

As another example, a front-end application might interface directly with users and forward requests to a remotely-located back-end program in another computer to get requested data or perform a requested service. Relative to the client/server computing model, a front-end is likely to be a client and a back-end to be a server.

The developer app 44 may use a Representational State Transfer (REST) Application Program Interface (API) to hook into the messaging, topological, and demographic data provided by the concert controller 100 to deploy new and unique developer apps 44. A RESTful API is an API that complies with the following constraints applied to the architecture, while leaving the implementation of the individual components free to design:

Client-server. A uniform interface separates clients from servers. This separation of concerns means that, for example, clients are not concerned with data storage, which remains internal to each server, so that the portability of client code is improved. Servers are not concerned with the user interface or user state, so that servers can be simpler and more scalable. Servers and clients may also be replaced and developed independently, as long as the interface between them is not altered.

Stateless. The client-server communication is further constrained by no client context being stored on the server between requests. Each request from any client contains all of the information necessary to service the request, and any session state is held in the client.

Cacheable. As on the World Wide Web, clients can cache responses. Responses must therefore, implicitly or explicitly, define themselves as cacheable, or not, to prevent clients reusing stale or inappropriate data in response to further requests. Well-managed caching partially or completely eliminates some client-server interactions, further improving scalability and performance.

Layered system. A client cannot ordinarily tell whether it is connected directly to the end server, or to an intermediary along the way. Intermediary servers may improve system scalability by enabling load-balancing and by providing shared caches. They may also enforce security policies.

Code on demand (the only optional constraint). Servers can temporarily extend or customize the functionality of a client by the transfer of executable code. Examples of this may include compiled components such as Java applets and client-side scripts such as JavaScript.

Uniform interface. The uniform interface between clients and servers, discussed below, simplifies and decouples the architecture, which enables each part to evolve independently.

Complying with these constraints, and thus conforming to the REST architectural-style, enables any kind of distributed hypermedia system to have desirable emergent properties, such as performance, scalability, simplicity, modifiability, visibility, portability, and reliability.

There are several major hurdles preventing the general adoption of synchronous, event-driven applications in the mobile space. First among these is the inherent clock-drift and time delta between different devices even those on the same carrier's network and in the same location. Mobile devices can be as much as several minutes off between adjacent devices. Additionally, the clock drift experienced by an individual device can be noticeable over timeframes as short as tens-of-minutes. While this does not affect typical mobile device operations such as email, Facebook, or web-browsing it will completely destroy the shared experience when commands are not executed concurrently by user devices 6. To counter the clock synchronization problem, the platform library automatically computes clock deltas between all participating devices against a common master clock and maintains very close synchronism for the duration of the event. This auto-negotiation is managed by the library itself without any work needing to be done by consuming applications. Dependent upon close clock synchronization is the ability of commands to be executed simultaneously at a designated time in the future by all participating devices or by all devices in a selected subgroup. To support this requirement, all command execution objects in the platform implement a common "execute" method that adds the contained command to an internal queue of commands that are scheduled to be executed at the scheduled time. The framework provides additional methods to remove, repeat, or change a given command as well as a call-back so that the system can be notified when a given command has been executed. Another major hurdle is the central distribution of messages. An individual mobile device does not have the computing capacity to manage and maintain communications between potentially several tens-of-thousands of devices active at any given venue.

Figure 11:
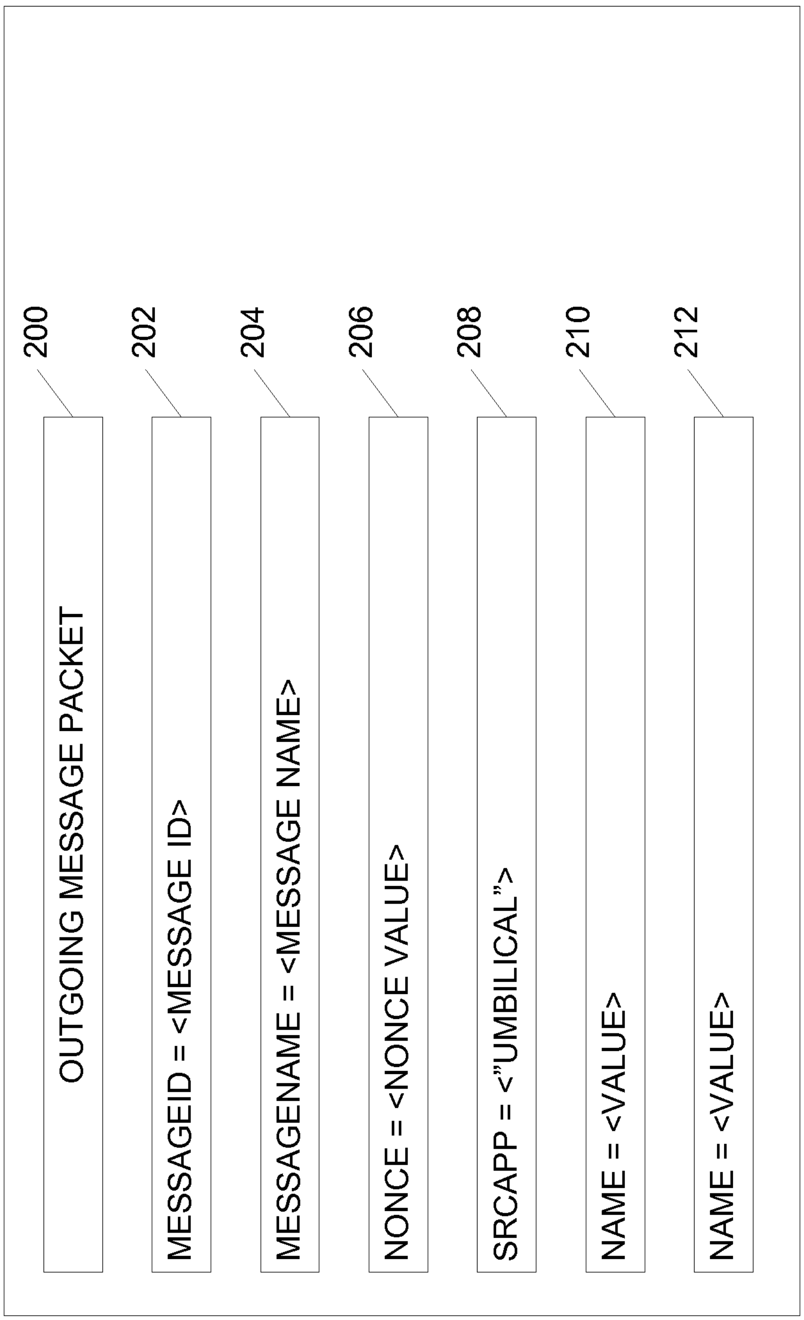
FIG. 11 is a block diagram of the structure of a packet including the register information which is sent between a client device and the controller for establishing a connection for exchanging information.

FIG. 11 is a block diagram of the structure of a packet 200 which may comprise a command, data, or both. The packet 200 is made up of a plurality of blocks in succession. The order of blocks is based on a particular protocol. Other orders could be provided. Blocks 202 and 204 respectively carry a message ID and message name. Block 206 is a nonce value for authenticating devices to each other. Block 208 identifies a current application, and blocks 210 and 212 respectively contain current values. These values could comprise, for example, the command or data.

FIG. 12 illustrates a register message 240 which is sent between a client portable interactive device 6 and the controller for establishing a connection for exchanging information. The order of the following blocks is preferred in common protocols. The order is not essential. Block 242 is a message ID having a numerical value. Block 246 carries a message name. Block 248 is a nonce. In an outgoing message, block 248 comprises the nonce provided with the last response. In an incoming message, block 248 is the nonce which will be used in the next outgoing message. Block 250 identifies a subsystem from which a card message originated. Block 252 describes a user ID, which will generally identify a particular piece of hardware. Block 254 carries a password. Block 258 is a device token that is used in connection with steering a signal to a proper destination, and block 260 identifies a device type. Blocks 262 and 264 respectively carry a code for the success of registration of one device with another and a string of data to provide a user-readable message. Block 266 provides a unique registration number for the device to be used in subsequent communications.

In accordance with the present subject matter, the message structures of FIGS. 11 and 12 may be implemented in new ways. Preparation of messages requires construction and de-construction of objects with several types of operating parameters many of which are irrelevant to the operation of business logic. Creation and transmission of messages within the application space can be accomplished without requiring knowledge of the message construction or de-construction process.

Message-aware applications are provided with high-level objects implementing a standard interface for accessing per-message and common message parameters. This interface behaves as a familiar access method on the object providing interrogation of messages 240 for fields such as individual names fields, setting of named fields, interrogating and setting of common fields, access to error conditions, or other fields which may be included among fields 242 through 266.

Once constructed, the framework provides a simple mechanism to initiate transmission of the message to a set of targets. Ways of defining sets of targets are further described below. The framework further provides simplified access to received messages. In the communications server 138 (FIG. 2) messages are placed into an outgoing transmission queue; received messages are placed into the incoming queue and delivered to the appropriate business logic as defined by the message.

The controller-only framework includes provision to segregate client portable interactive devices 6 and other devices into arbitrary groupings based on any provided metric. The grouping may be based on types of hardware, accessible information regarding users 4, or other indicators. Standard metrics include: device role, e.g., primary controller, Jumbotron®, OCS, or client; gender; age; location within a venue; device type, e.g., iOS, Android, or HTML5; device family, e.g., iPhone 3G, iPhone5, iPad, or the like; and randomly selected set members.

Figure 13:
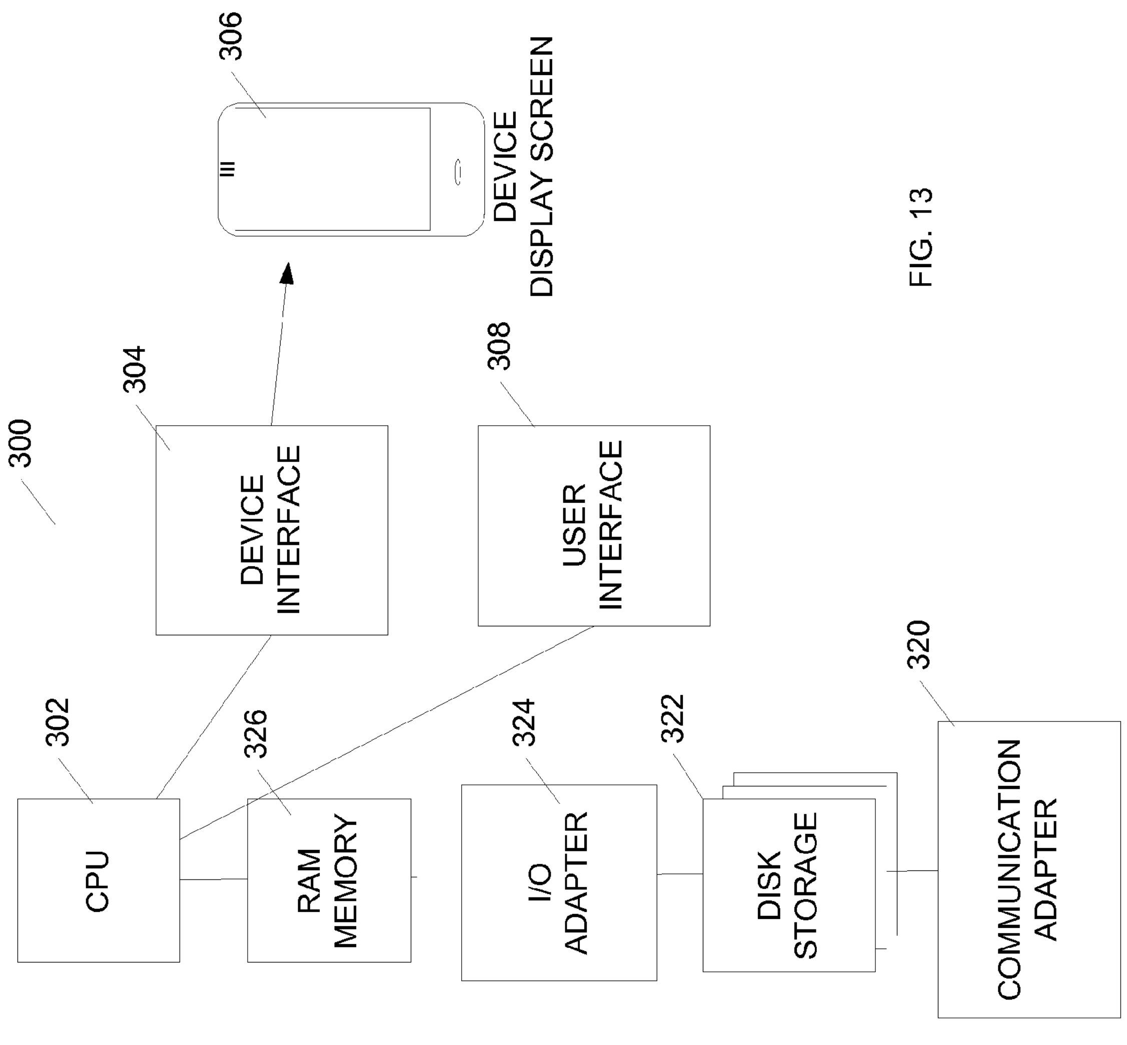
FIG. 13 is a block diagram of a client subsystem.

FIG. 13 is a block diagram of a client subsystem 300 in a portable user device 6. A CPU 302 communicates via a device interface 304 to a display device screen 306. The display device screen 306 is included in the controller as illustrated in FIG. 3. A user interface 308 provides data to the CPU 302. The user interface 308 may comprise the central server 8 (FIG. 1B). A communication adapter 320 receives incoming data which can be stored on disk storage 322. Stored data is coupled to an input/output adapter 324. Data can be loaded into RAM memory 326 for processing by the CPU 302. The CPU 302 may produce data for both incoming and outgoing purposes.

Figure 14:
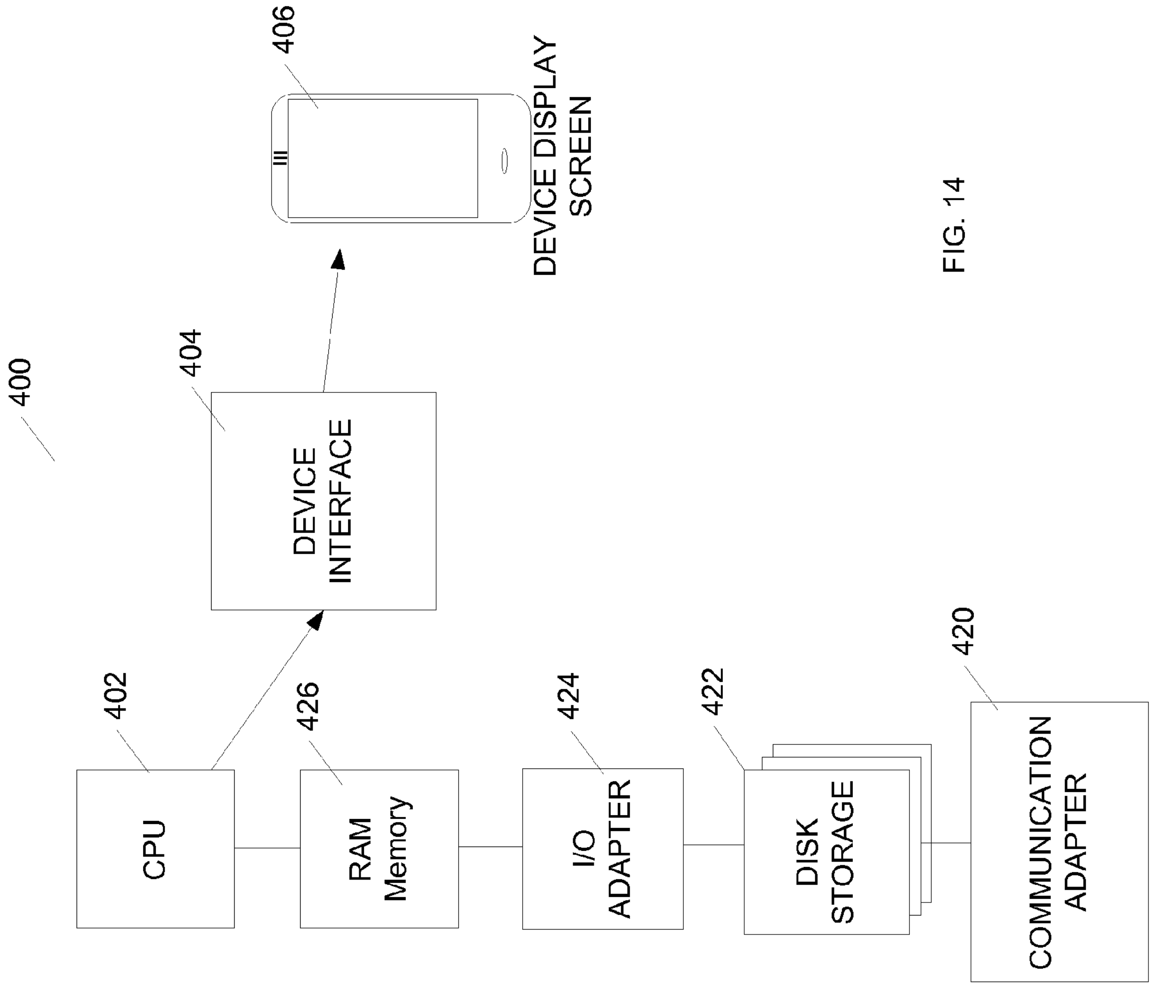
FIG. 14 is a block diagram of a controller subsystem.

FIG. 14 is a block diagram of a controller subsystem 400. A CPU 402 communicates via a device interface 404 to a display device screen 406. The device interface 404 may also function as a user interface that provides data to the CPU 402. A communication adapter 420 receives incoming data which can be stored on disk storage 422. Stored data is coupled to an input/output adapter 424. Data can be loaded into RAM memory 426 for processing by the CPU 402. The CPU 402 may produce data for both incoming and outgoing purposes.

The framework allows the creation, collection, and persistence of arbitrary metrics for use as segregation criteria. Individual devices can be added or removed from any grouping as desired. Groups are independent and can overlap in any manner desired. Once defined, the grouping can be used as targets for specific commands. Once received by portable interactive devices 6, commands are queued and executed according to the timing of the individual received message. Portable interactive devices 6 register simple handlers for each type of command expected which are then invoked at the appropriate time and without business logic intervention. Client device business logic is provided with all message information including per-message specific data to affect the desired operation. Business logic can implement any type of operation without regard to how and when the message was received. Messages received by portable interactive devices 6 after the assigned execution time are returned by the framework to the originator for off-line analysis.

Specific time messages are executed at a specific moment in time as indicated as part of the sent message. This is the most common form of message in the present system and enables the synchronized execution of commands. The stated time of execution is relative to the standard clock 9 (FIG. 1B). Each device has its offset from this standard clock and executes the command at that appointed time. Messages received or processed after their assigned execution are logged and sent back to the sender with diagnostic information.

The present system creates a relationship between the time at which a command is issued and the time at which the command will be executed. When constructed, messages can be assigned time-dependent execution values of: upon receipt; upon receipt with priority; a time in the future after receipt; or a specific time. The point in time in the future beyond receipt may be set by data provided with the message. Received messages are each time stamped upon arrival and executed at the future time.

In one illustration in which latencies range from 0 to 15 seconds, the system may be programmed to command a firing time that is 20 seconds later than the time at which a command is provided from the central server 8. A portable interactive device 6 for which a latency of 15 seconds has been measured can be commanded to respond 5 seconds after a command is received. A portable interactive device 6 for which a latency of 9 seconds has been measured can be commanded to respond 11 seconds after a command is received. The portable interactive devices 6 will use their internal clocks to count to a firing time.

The system presented provides support for the following areas: clock-drift; message transmission; message construction; command execution; command timing; device family segregation; data access; configuration; and capabilities.

Devices present within a given environment may deviate from a standard clock by many seconds even those connected via the same cellular tower or other technology. While sufficient for most device-centric operations it is insufficient for the closely time-synchronized operations possible within the system environment. To counter this inherent time difference, the system framework provides a standard clock with low-latency access mechanisms and a background correction process to keep the device clock within a certain configurable window.

Device operating-systems do not typically expose low-level access to the system clock to effect an actual change to the time setting. In the present system, knowing the value of the time delta between the standard clock and the device clock obviates the need to change a time setting.

As the clock on each device is inaccurate even over the period of several hours, the system foundation will resynchronize the delta periodically to keep within a pre-determined maximum time delta. A more precise delta requires the re-synchronization of the clock on a more rapid schedule to ensure minimal drift. This time delta is configurable within the framework and is transmitted to participating devices upon registration or upon change of the value at the central location.

Simplified access is provided to data stored by the back-end. Business logic is isolated from database mechanisms and can request specific data as needed. The data access framework supports the creation of arbitrary data elements (groupings, commands, etc.) for later reference by name. This can be used to send a specific complex or often-used command or to define a grouping of devices.

The system framework supports configurable items that are transmitted to the affected devices automatically upon registration, event start, change to the item, or on-demand. Standard items are: maximum clock-drift; video effect fade period; and device family parameter limits such as frames/sec, camera, and screen resolution.

When transmitted, any device-specific items are included to ensure the business logic is able to properly operate on the different platforms.

The system framework has a capabilities database for known devices. The database is continually updated with new devices. Capabilities allow the devices to fail gracefully when a command parameter is unable to be executed due to physical device limitations. The capabilities framework provides default sensible behavior for features unavailable on a given platform.

While the foregoing written description of the present subject matter enables one of ordinary skill to make and use what is considered presently to be the best mode thereof, those of ordinary skill will understand and appreciate the existence of variations, combinations, and equivalents of the specific embodiment, method, and examples herein. The present subject matter should therefore not be limited by the above described embodiment, method, and examples, but by all embodiments and methods within the scope and spirit of the present subject matter.

The invention claimed is:

1. A system providing an operating context for an app in an operating system in which variable latencies must be accommodated and in which a shared user experience is created over at least a set of portable interactive client devices, each portable interactive client device comprising an app to perform an element of the shared user experience, the system comprising:

a concert controller comprising a server, the server and a media system comprising sources for providing the shared user experience, the server comprising a program to interact with each of the portable interactive client device s and to command execution of the app;

a framework comprising a front-end, the front end comprising a portable interactive client device interface, the portable interactive client device coupling the portable interactive client devices to the concert controller, the framework further comprising a back-end coupling said sources for provision to said portable interactive client devices;

the server comprising a master clock and further comprising a processor and a memory for computing clock deltas between inputs received from each of the portable interactive client devices and said master clock, said server being connected to provide and receive signals via an NTP host server to synchronize inputs from each of said plurality of portable interactive client devices;

said processor further providing a time offset signal corresponding to a respective clock delta for each of said portable interactive client devices to equalize response time to a command signal from said server; and an application program interface coupled to cooperate with functions of the server, said application program interface comprising hooks for cooperating with an app interfacing with the shared user experience.

2. A system according to claim 1 wherein said application program interface comprises RESTful API.

3. A system according to claim 2 wherein said RESTful API is coupled by said framework to interface with a next application without requiring a restart.

4. A system according to claim 3 wherein said back-end comprises a generalized table access supporting all Create, Retrieve, Update, Delete (CRUD) operations.

5. A system according to claim 4 wherein said front-end is selectively coupled to a back-end program in another computer.

6. A method of providing an operating context for an app in an operating system in which variable latencies must be accommodated and in which a shared user experience is created over at least a set of portable interactive client devices comprising:

operating a program in a concert controller, the concert controller comprising a server and media system to interact with each of the portable interactive client devices and to command execution of the app, the media system comprising sources;

interfacing said concert controller to said portable interactive client devices at a portable interactive client device interface, the portable interactive client device interface being included in a front-end of a framework;

coupling the sources for provision to said portable interactive client devices at a back-end of said framework;

computing on a processor clock deltas between inputs received from respective portable interactive client devices and a master clock time;

coupling said server to provide and receive signals via an NTP host server to synchronize inputs from each of said portable interactive client devices;

providing a time offset signal indicative of a respective clock delta for each of said portable interactive client devices to equalize response time to a command signal from said server, the server being coupled to receive queries from the portable interactive client devices requesting whether new command signals have been issued during a current operating cycle;

creating varying delays in respective portable interactive client devices for response to firing commands sent to the portable interactive client devices in order to compensate for varying latencies and establishing a common time for execution of a command by said portable interactive client devices; and providing hooks in executing an application program interface to interact with an app for cooperating with the shared user experience.

7. A method according to claim 6 further comprising constraining operation of the application program interface to operate as a RESTful API.

8. A method according to claim 7 further comprising directing data to a generalized table access supporting all Create, Retrieve, Update, Delete (CRUD) operations.

9. A method according to claim 8 comprising selectively coupling the front-end to a back-end program in another computer.

* * * * *